April 14, 1970   N. W. WRAY, SR   3,505,747
ELECTRICAL SCORING DEVICE FOR MULTIPLE CHOICE EXAMINATIONS
Filed July 3, 1967   2 Sheets-Sheet 1
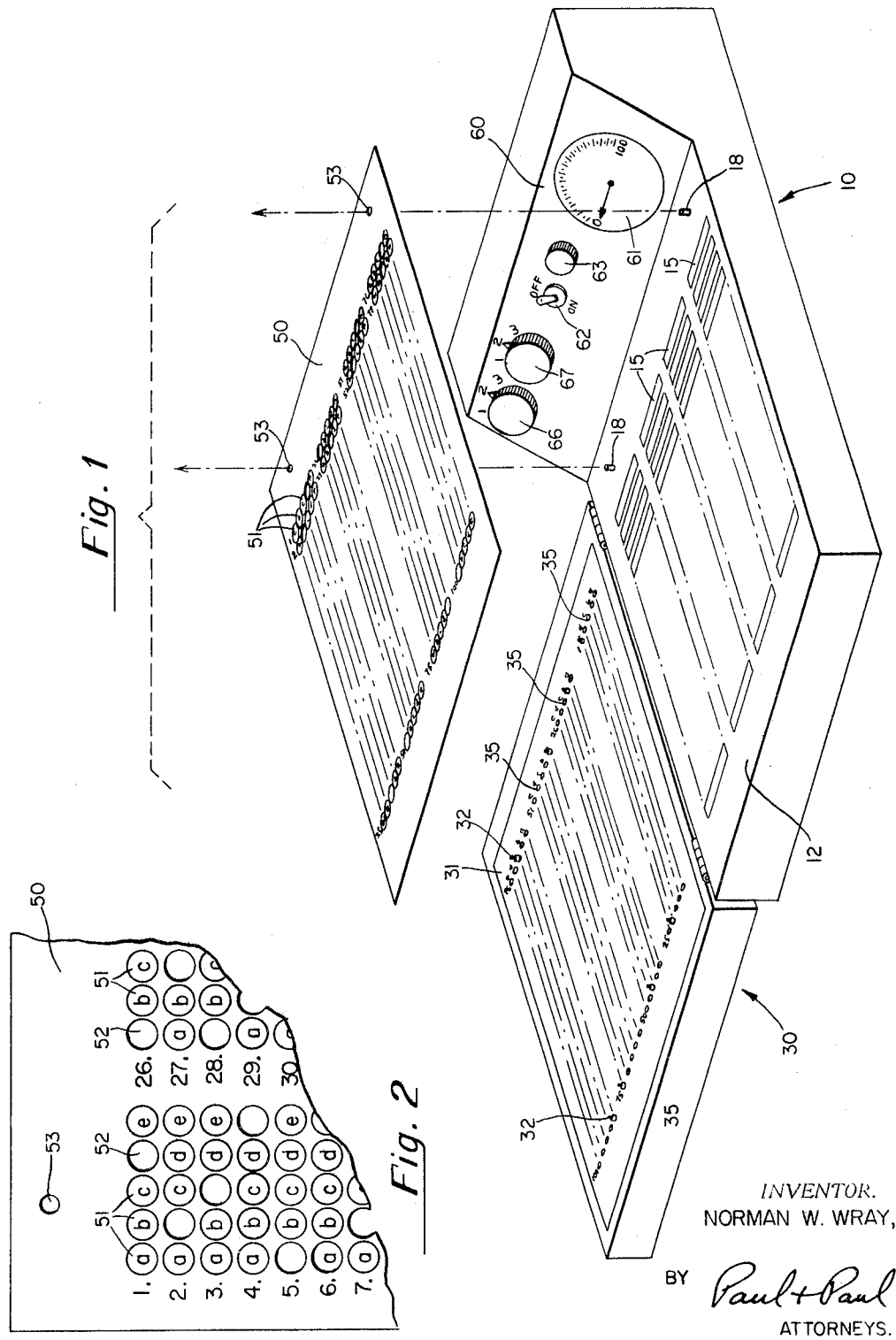
INVENTOR.
NORMAN W. WRAY, SR
BY Paul + Paul
ATTORNEYS.

United States Patent Office 3,505,747
Patented Apr. 14, 1970

3,505,747
ELECTRICAL SCORING DEVICE FOR MULTIPLE
CHOICE EXAMINATIONS
Norman W. Wray, Sr., Box 312, R.F.D. 2,
Glen Mills, Pa. 19342
Filed July 3, 1967, Ser. No. 650,871
Int. Cl. G09b 7/00
U.S. Cl. 35—48                                          1 Claim

ABSTRACT OF THE DISCLOSURE

An electrical scoring device for grading multiple choice type of examination sheets. The examinee indicates his answer choices by punching holes in an answer sheet which is then placed between the base and hinged lid of the scoring device. The base contains at least as many conductive strips as there are questions while the lid contains as many holes as there are possible answers. Each hole corresponding to a correct answer is provided with a spring-biased contactor pin. For each correct answer punched an appropriate contactor pin and conductive strip complete a circuit. Each correct answer results in incremental current flow, the total of which is indicated on a grading meter showing percentage of correct answers.

BACKGROUND OF THE INVENTION

Field of the invention

The present invention relates to scoring devices for educational tests of the multiple choice type.

Description of the prior art

Of the prior art patents, the following are believed to be the most pertinent: Nos. 2,943,400, Griswold, July 5, 1960; 3,003,259, Sullivan, Oct. 10, 1961; 3,126,649, Sullivan, Mar. 31, 1964; 3,148,460, Haritonoff, Sept. 15, 1964.

BRIEF DESCRIPTION OF THE DRAWING

FIG. 1 is a perspective illustration of a scoring device embodying the present invention;

FIG. 2 is a fragmentary view of a portion of a typical answer sheet;

DESCRIPTION OF THE PREFERRED EMBODIMENT

Figure 4:
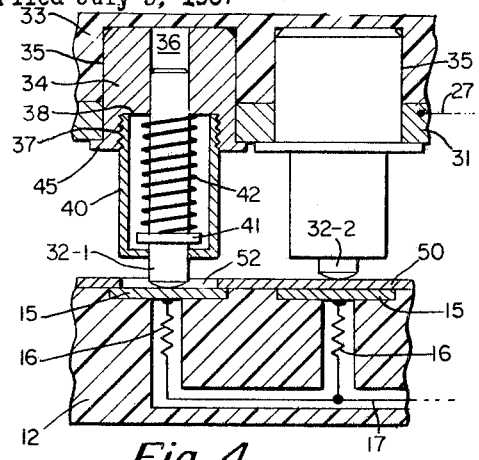
FIG. 4 is an enlarged fragmentary view, partly in section, showing two of the spring biased contactor pins in the lid and two of the contactor strips in the base plate.

In FIG. 1, the electrical scoring device is shown to comprise a casing 10 having a hinged lid 30 which, when closed, covers a base plate 12. Projecting above the base plate 12 is an instrument and control panel 60. The casing 10 may preferably be of plastic, but may be made of wood or any other suitable material having electrical insulating properties.

In FIG. 1, reference numeral 50 identifies one of the paper answer sheets which is to be scored or graded by the electrical scoring device of the present invention. A fragmentary portion of answer sheet 50 is shown in FIG. 2.

While the examination may contain twenty-five questions, in other cases fifty questions, and in still other cases seventy-five or some other number of questions, a common form of examination contains one hundred questions, and accordingly, the answer sheet 50 illustrated in the drawing is designed for an examination of one hundred questions, with five possible answers for each question. The answer sheet 50, as printed, contains five hundred printed circles 51 arranged in four columns, each column having twenty-five rows, with five circles 51 in each row identified as a, b, c, d and e. The five circles 51 in each row of column 1 correspond to the five possible answers to Questions Nos. 1 through 25; each row of column 2 contains circles 51 corresponding to the five possible answers to Questions Nos. 26–50; and so on. In FIG. 2 of the drawing, the examinee is shown to have punched one hole 52 in each five-circle group to indicate his (or her) answer. In FIG. 2, the examinee has indicated that in his opinion the correct answer to Question No. 1 is d; that the correct answer to Question No. 2 is b; that the correct answer to Question No. 26 is a; and so on.

Inserted in the non-conductive (preferably plastic) lid 30 is a conductive metal plate 31. As is later described in further detail, the lid 30 and the metal plate 31 are each provided with five hundred registered holes 35 arranged in four columns of twenty-five rows each, with five holes 35 in each row, identified as a, b, c, d and e, corresponding in both number and arrangement to the five hundred circles 51 in the answer sheet 50.

Figure 3:
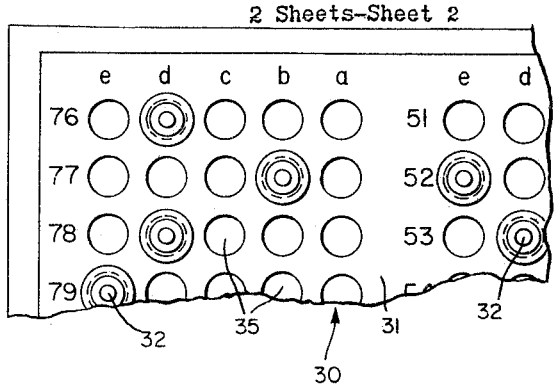
FIG. 3 is a fragmentary view of a portion of the pin board, located in the lid of the device.

One of the holes 35 in each five-hole row is provided with a spring-biased contactor pin 32. This is illustrated generally in FIG. 3, where contactor pins 32 are shown to be inserted in hole d of Row No. 76; hole b of Row No. 77; hole d of Row No. 78; hole e of Row No. 52; etc. The contactor pins 32 are readily removable so that they may be taken out of one hole and put in another. Prior to using the scoring device to grade the examination papers, the Examiner sets up the arrangement of the pins in the lid of the device for that particular examination by placing a contactor pin 32 in that one hole of each group which corresponds to the correct answer.

While the construction of the lid 30 and of the contactor pins 32 may take different forms, one suitable form is illustrated in FIG. 4. In FIG. 4, the lid 30 is illustrated as consisting of a body portion 33 of insulating material which may be wood but is preferably plastic. The lid body portion 33 is provided with five hundred blind holes or wells which are formed or bored thereinto. The holes are arranged in four columns of twenty-five rows each, each columnar row having five holes. Mounted on the face of the insulating lid body portion 33 is a conductive metal plate 31 which may be secured to the lid body portion 33 by screws or any other suitable means not shown. The conductive metal plate 31 is also provided with five hundred holes which extend through the plate 31 and which are arranged in a manner corresponding to that of the holes in the lid body portion 33, so that when the plate 31 is mounted on the lid body portion 33 the holes in the conductive metal plate 31 are in registry with the holes in the insulating lid body portion 33. The single reference numeral 35 has been used in the drawing to identify the registered holes.

Inserted into each of the registered holes 35 by a press fit, is a conductive metal plug or insert 34 having a flange 45 at its upper end. Insert 34 has a central bore 36 the diameter of which is made just sufficiently slightly larger than the outer diameter of the metal pin 32 to allow the pin 32 to slide up and down in the bore 36. The upper portion of the conductive metal insert 34 is provided with a larger bore 37 which is threaded to receive the externally threaded end of a cylindrical metal cap or retainer 40. The cap end of retainer 40 is provided with a central hole through which the tip end of the contactor pin 32 passes. The pin 32 is provided with a flange 41 which, except when the pin 32 is depressed, abuts against the undersurface of the cap portion of the retainer 40. A helical compression spring 42 embraces the body of the pin 32. The outer end of spring 42 is retained by the pin flange 41. The inner end of the spring abuts against the shoulder 38 formed in the insert 34 at the junction of the larger and smaller bores 37 and 36.

The base plate 12 is provided with one hundred conductive strips 15 arranged in four columns of twenty-five each. The conductive strips 15 are of such length transversely and are so located and arranged relative to the plate 31 in the lid 30 that when the lid 30 is closed, each strip 15 in the base plate 12 is in registry with a group of five holes 35 in the lid plate 31. Connected to each conductive strip 15 is one lead of a separate resistor 16. Thus, the scoring device 10 being described has one hundred resistors 16. These resistors may be mounted in the base portion or in the instrument panel portion. Each resistor 16 is of the same ohmic value. The opposite end leads of each of the one hundred resistors 16 are connected to a common conductor 17 which, as later described, leads to one terminal of the battery 80.

To facilitate insertion of the answer sheet 50 into the scoring device 10, the base plate 12 is provided with two alignment posts 18 and the answer sheet 50 is provided with alignment holes 53 in corresponding locations.

When the answer sheet 50 is placed on the base plate 12, using the alignment holes 53 and posts 18, and the lid 30 is closed, the spring-biased conductive pin 32 will either make conductive contact with one of the conductive metal strips 15 of the base plate 12 or will be insulated therefrom by the paper answer sheet 50, according to whether or not the answer sheet 50 has a hole 52 punched at the location of the pin 32.

FIG. 4 illustrates two pins 32–1 and 32–2 in successive rows. In FIG. 4, the pin 32–1 on the left is shown passing through hole 52 punched in the answer sheet 50 whereas the pin 32–2 on the right is shown as pressing against the paper of the answer sheet. Thus, FIG. 4 illustrates a situation wherein the examinee has correctly answered the question to which pin 32–1 is related by punching a hole at the location which is aligned with pin 32–1, but has not correctly answered the question to which pin 32–2 is related by failing to punch a hole at the location aligned with pin 32–2.

When a pin such as pin 32–1 in FIG. 4 is in alignment with a hole 52 punched in the answer sheet 50, the pin makes good conductive contact with the conductive strip 15 in the base plate 12 and a conductive path is completed from one terminal of the battery to the other (assuming certain switches later referred to are in closed position). In FIG. 4 the conductive path extends from the common lead 17 through resistor 16, the conductive strip 15, the pin 32–1, the conductive metal insert 34, and the conductive metal plate 31, and the conductive lead 17 back to the other terminal of the battery.

The conductive connection between pin 32–1 and the metal insert 34 may have several paths. The most reliable is the path which includes the pin flange 41, the compressed metal spring 42 and the shoulder 38. Another path is directly from a point on the lower shank of the pin to the insert 34. Yet another possible path is from a point on the shank of the pin near the tip to the cap retainer 40 and then to the insert 34.

Figure 5:
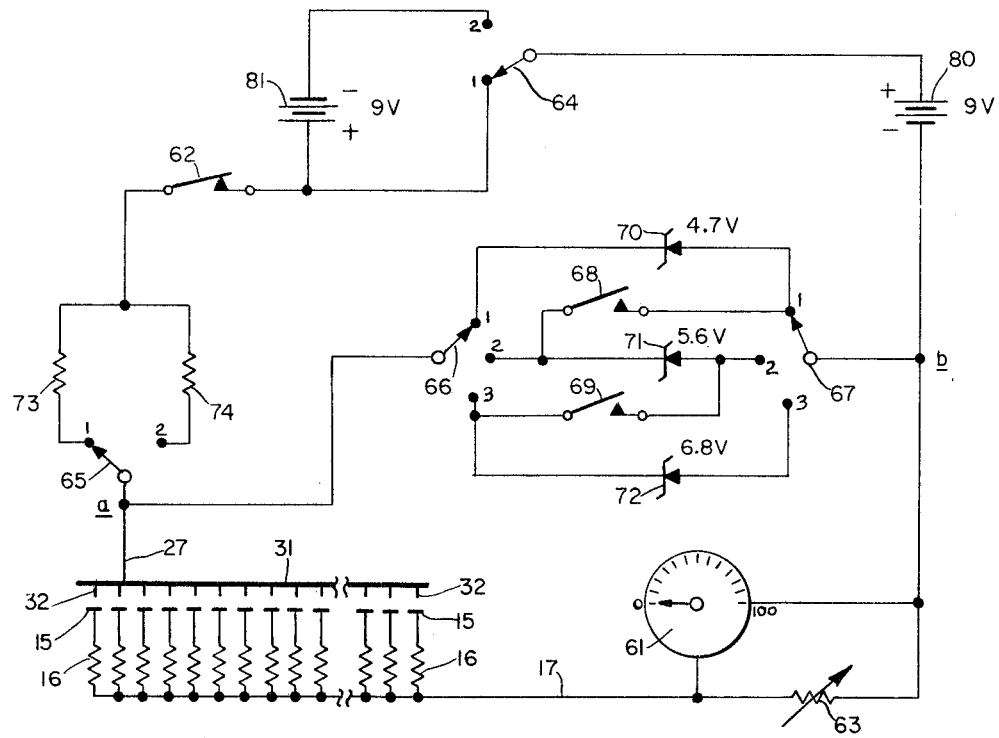
FIG. 5 is a schematic of a typical electrical circuit.

In FIGURE 1, the instrument and control panel 60 is illustrated as including a meter 61 calibrated to read in terms of percentage of questions which are correctly answered. The panel 60 also includes an on-off switch 62, a potentiometer control 63, and selector switches 66 and 67. A suitable electrical circuit for the scoring device is illustrated in FIG. 5. The circuit in FIG. 5 includes some additional switches which do not appear on the face of the control panel 60. Those additional switches are mounted behind the panel and are accessible from the rear.

Referring now to FIG. 5, there is shown an electrical circuit which includes two 9-volt batteries 80 and 81, three Zener diodes 70, 71 and 72, various switches identified as 62, 64, 65, 66, 67, 68 and 69, a calibrating potentiometer 63, and the ammeter 61. Also included in the circuit of FIG. 5 are resistors 73 and 74, and a number of elements which have previously been referred to, namely, the conductive plate 31, the contactor pins 32, the conductive strips 15, the resistors 16, one for each of the conductive strips 15, and the leads 17 and 27.

The circuitry shown in FIG. 5 is designed to permit use of the scoring device for examinations having anywhere from twenty-two to one hundred questions. It will be understood that in general the larger the number of questions in the examination the greater the number of resistors 16 which will be placed in parallel with each other, and the larger the current flow, assuming a given value of voltage. The provision of the three Zener diodes 70, 71 and 72, allows a choice of regulated voltage values between the points $a$ and $b$ of the circuit of FIG. 5. For example, assuming switches 68 and 69 to be open, if selector switches 66 and 67 are both thrown to position 1, a regulated voltage of 4.7 volts controlled by Zener diode 70 will be available between the points $a$ and $b$. By changing the selector switches 66 and 67 to the positions 2 and 2, respectively, a regulated voltage of 5.6 volts, controlled by Zener diode 71, will be available between the points $a$ and $b$. By adjusting the selector switches 66 and 67 to points 3 and 3, a regulated voltage of 6.8 volts, controlled by Zener diode 72, will be available between the points $a$ and $b$.

For an examination of one hundred questions, the smaller value of voltage, namely 4.7 volts, will in most cases be suitable. To set the scoring device for the one-hundred question examination, the examiner places one hundred contactor pins 32 in their correct-answer positions in the one hundred groups of five holes each in the lid 30. He then sets the selector switches 66 and 67 to positions 1, and closes the on-off switch 62. Switches 68 and 69 are open, and switches 64 and 65 are set to positions 1. He then closes the lid 30 and adjusts potentiometer 63 until the reading on the ammeter 61 is 100%. He is then ready to grade the first answer sheet. If, for example, nineteen of the questions are answered incorrectly, nineteen of the one hundred pins will fail to make contact with the contactor strips 15, and nineteen of the one hundred resistors 16 will not be connected in parallel into the circuit. Accordingly, the current through the ammeter 61 will be less, and the reading on the dial of the ammeter 61 will be 81%.

If the examination to be marked is a seventy-five question examination, an increased voltage may have to be applied across the circuit between points $a$ and $b$. For example, the selector switches 66 and 67 may have to be switched to positions 2 or 3 to connect into the circuit the 5.6-volt Zener diode 71, or the 6.8-volt Zener diode 72. Calibration of the meter 61 is made as before by adjusting the potentiometer 63 with the lid 30 closed with seventy-five pins 32 in correct-answer position. The entire fourth column of holes in the lid 30 will be void of any contactor pins.

For a twenty-five question examination, a still greater voltage will have to be applied between points $a$ and $b$ and it will be necessary to connect into the circuit the additional battery 81. This is done by throwing switch 64 to position 2. This provides a total voltage of 18 volts. To provide regulated voltage of the order of magnitude of 18 volts, the Zener diodes 70, 71 and 72 are connected in series. This is done by closing the switches 68 and 69 and by placing selector switch 66 in position 1 and selector switch 67 in position 3. When this is done, all three Zener diodes are in series and a regulated voltage of 17.1 volts (4.7+5.6+6.8) is applied between the points $a$ and $b$. Sufficient current will now be provided to allow the meter 61 to be calibrated by potentiometer 63 to read 100% when twenty-five of the resistors 16 are connected in parallel in the circuit.

It was indicated above that to adapt the scoring device to an examination having less than one hundred questions, all pins would be removed from the holes corresponding to the unused questions. For example, for a fifty-question examination, all pins would be removed from the last two columns of holes in the lid. An alternate way, would be to cover the last two columns of conductive strips in the base with paper or other insulating material.

While the preferred embodiment of this invention has been described in some detail, it will be obvious to one skilled in the art that various modifications may be made without departing from the invention as hereinafter claimed.

What is claimed is:

1. A scoring device for grading multiple choice examination papers in which each answer is indicated by a hole in an answer sheet, said device comprising:
   (a) a base on which said answer sheet is placed,
   (b) a lid pivotally connected to said base,
   (c) a control and instrument panel integral with said base beyond the area covered by said lid,
   (d) a plurality of holes in said lid arranged in rows and columns, the number of holes in the columnar rows corresponding to the number of multiple-choice answers,
   (e) a removable conductive contactor pin in not more than one hole in each columnar row, the position of said one hole corresponding to the correct answer for the question,
   (f) a common conductive plate in said lid connected electrically with all of the contactor pins,
   (g) a plurality of conductive strips in said base arranged in columns and rows and corresponding to the rows and columns of holes in the lid, each columnar row in the base comprising but a single elongated conductive strip of sufficient dimension to cover all of the holes in the corresponding columnar row in the lid,
   (h) a source of supply voltage,
   (i) means for connecting one terminal of said supply voltage to said common conductive plate in the lid,
   (j) a plurality of individual resistances of substantially equal ohmic value, a separate one of said individual resistances being connected to each separate conductive strip in the base,
   (k) common conductor means for connecting all of the resistances to the other terminal of said supply voltage,
   (l) voltage regulator means including a plurality of Zener diodes and a plurality of selector switches connectable thereto for connecting selectively one of said Zener diodes, or more than one of said Zener diodes in series, across said source of supply voltage for supplying a selected one of a plurality of different regulated voltages between said common conductive plate and said common conductor means to accommodate for a substantially different number of examination questions;
   (m) a current meter connected to read the total current flow through said common conductor means, and
   (n) adjustable resistance means connected across said current meter for calibrating said meter to read in terms of percentage of answers correctly given.

References Cited

UNITED STATES PATENTS

| | | | |
|---|---|---|---|
| 1,997,178 | 4/1935 | Johnson | 35—48.2 |
| 2,142,419 | 1/1939 | Strongman | 35—48 |
| 2,528,828 | 11/1950 | Henry | 35—48.2 |
| 2,943,400 | 7/1960 | Griswold | 35—9 |
| 3,003,259 | 10/1961 | Sullivan | 35—48 |
| 3,126,649 | 3/1964 | Sullivan | 35—48 |
| 3,319,359 | 5/1967 | Rosenfield | 35—48 |

EUGENE R. CAPOZIO, Primary Examiner

J. H. WOLFF, Assistant Examiner